C. P. M. JACK.
FLOATING VESSEL.
APPLICATION FILED JAN. 23, 1915.
1,180,852.
Patented Apr. 25, 1916.
3 SHEETS—SHEET 1.
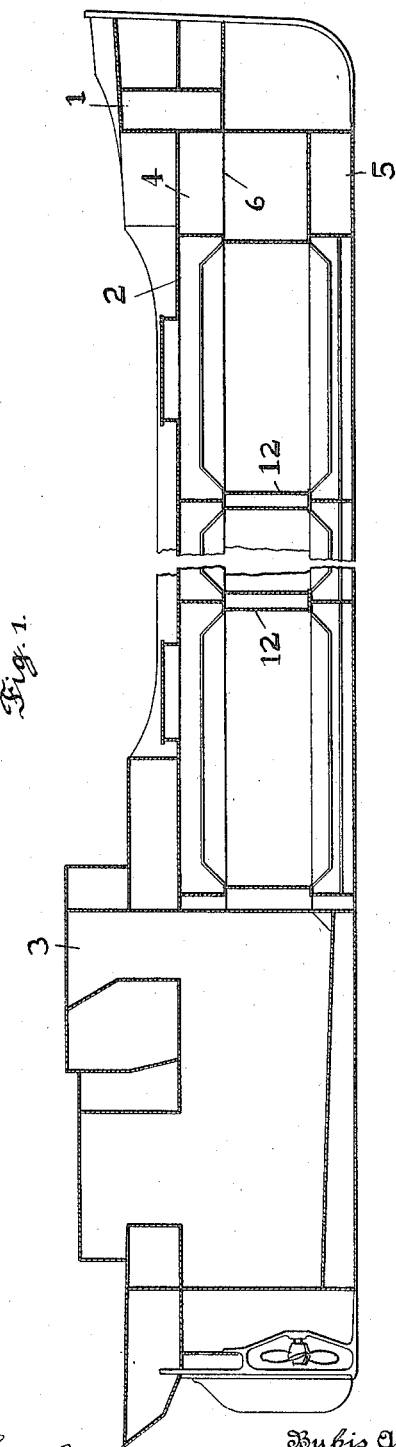
Witnesses:
Max Willemstyn.
Arthur E. Copeland
Inventor
Charles P. M. Jack.
By his Attorney
Samuel W. Balch

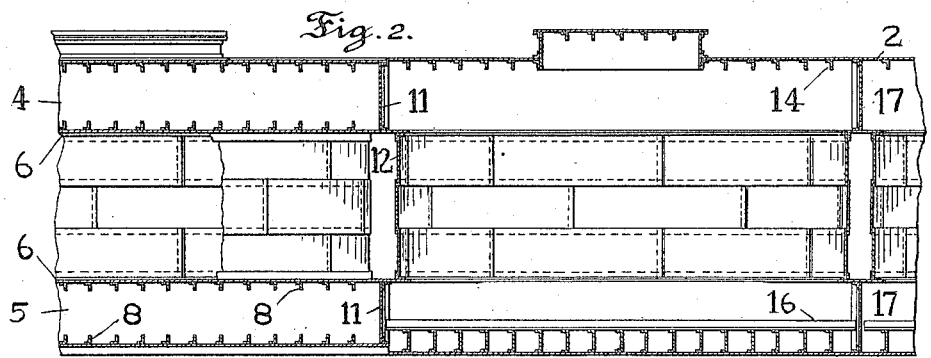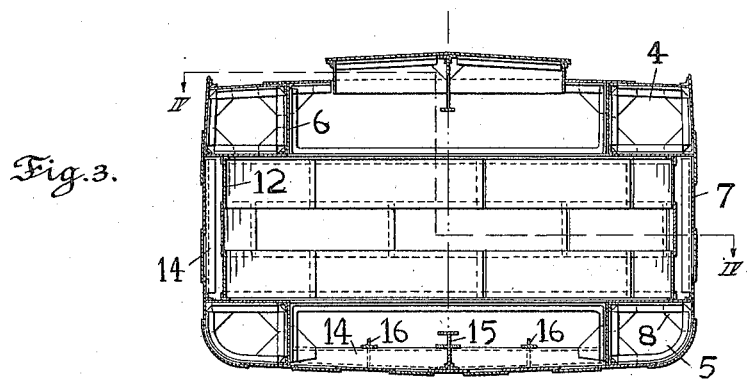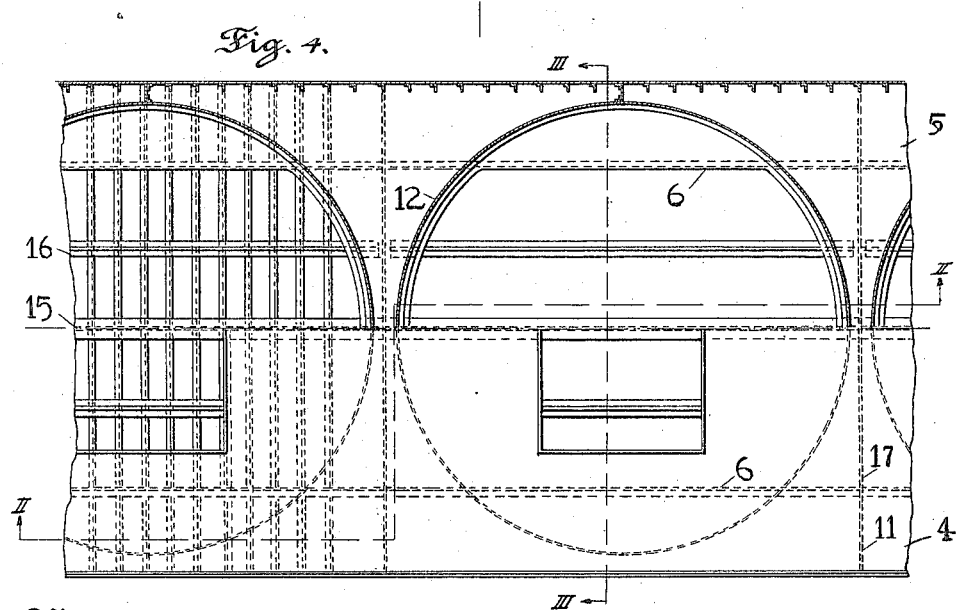

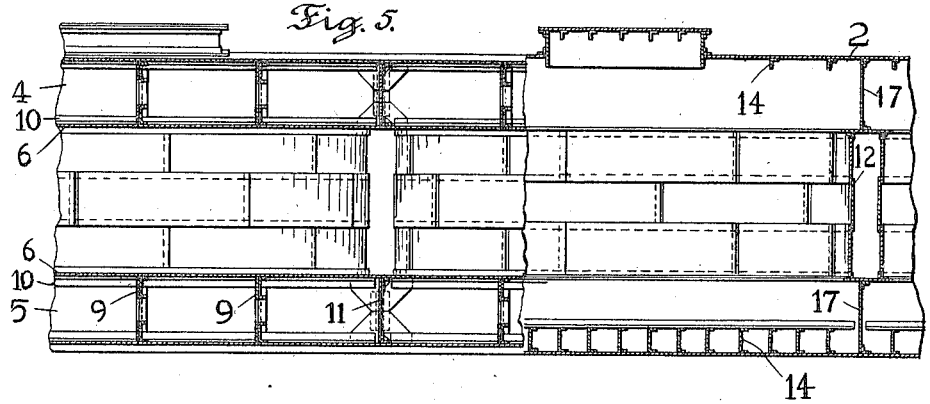
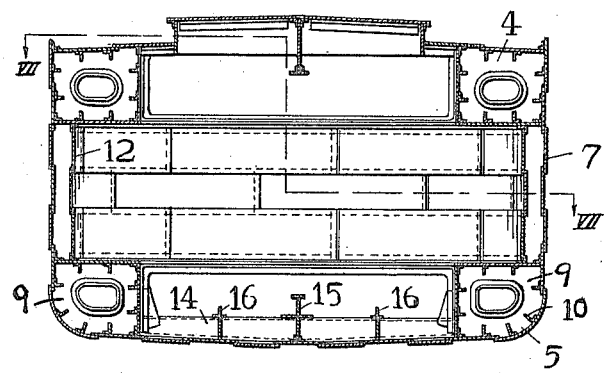
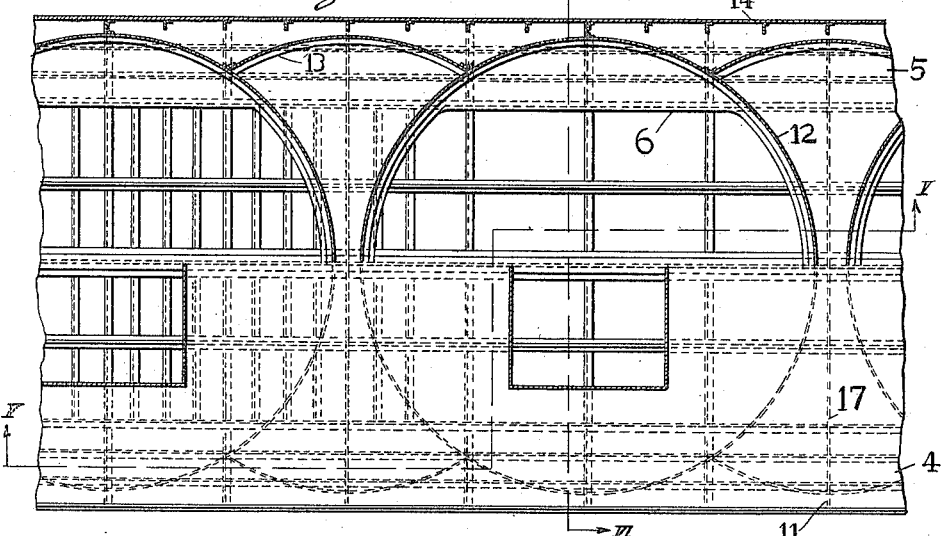

UNITED STATES PATENT OFFICE.

CHARLES P. M. JACK, OF NEW YORK, N. Y.

FLOATING VESSEL.

1,180,852.  Specification of Letters Patent. Patented Apr. 25, 1916.

Application filed January 23, 1915. Serial No. 3,864.

*To all whom it may concern:*

Be it known that I, CHARLES PETER MITCHELL JACK, a subject of King George V, Great Britain, and a resident of the borough of Brooklyn, in the city of New York, county of Kings, and State of New York, have invented certain new and useful Improvements in Floating Vessels, of which the following is a specification.

The object of this invention is to produce a floating vessel with longitudinal compartments which are so formed and framed with the side skin of the vessel that they will contribute materially to the strength of the hull.

A further object is to extend the invention to tank-vessels provided with tanks having vertical side walls which connect the upper and lower longitudinal compartments so as to further increase the strength of the hull.

In the accompanying three sheets of drawings which form a part of this application—Figure 1 is a vertical longitudinal section through a tank vessel embodying my invention. Fig. 2 is a vertical longitudinal section through a part of the body portion of the vessel on the line II—II of Fig. 4. Fig. 3 is a transverse section through the vessel on the line III—III of Fig. 4. Fig. 4 is a plan of a part of the body portion, partly in section on the line IV—IV of Fig. 3. Fig. 5 is a vertical longitudinal section through a part of the body portion of a modified construction of vessel on the line V—V of Fig. 7. Fig. 6 is a transverse section through the vessel on the line VI—VI of Fig. 7. Fig. 7 is a plan of a portion of the body portion, partly in section on the line VII—VII of Fig. 6.

The vessel comprises a bow portion 1, a body portion 2, and an engine-compartment and stern portion 3. On each side of the body portion is an upper longitudinal compartment 5. The longitudinal walls 6 6 of these compartments are continuous throughout the length of the body portion of the vessel and some of the walls constitute portions of the skin of the vessel. By means of a section of the side skin 7, to which both the upper and the lower compartments are rigidly connected, they are made to constitute respectively upper and lower members of a girder for the longitudinal stiffening of the vessel, the section of side skin which connects them being the girder web. The compartment walls may be stiffened, as shown in Figs. 2, 3 and 4, by transverse frames 8 8 at frequent intervals, or, as shown in Figs. 5, 6 and 7, by transverse frames 9 9 of heavier construction and at greater intervals with intermediate longitudinal ribs 10, 10. The compartments are preferably fully inclosed so as to serve as liquid carrying tanks. Transverse partitions 11 11 may be used to subdivide the compartments. Tanks with vertical cylindrically curved side walls 12 12 extend from side to side of the vessel and the walls in part lie between the upper and lower longitudinal compartments. The tank walls of adjoining tanks may be connected together by longitudinal partitions 13 13, between the upper and lower compartments which will constitute with the tank walls a continuous web between the upper and lower compartments in addition to the web formed by the side skin of the vessel. The vertical cylindrical tanks are constructed as set forth in my United States Letters Patent No. 1,085,086, granted to me January 20, 1914, for tank vessels.

The side skins of the vessel and the bottom and deck skins between and exterior to the compartments are stiffened by light transverse frames 14 14 connected at their ends to the longitudinal compartment walls. As the frames for the sides of the vessel are not continuous with the frames for the bottom and deck, it is not essential that they should be spaced the same. For example, fewer frames may be used on the sides and deck than on the bottom as the sides and deck are subjected to less strain than the bottom. Crossing the light transverse frames for stiffening the bottom are longitudinal beams including a keelson 15 and parallel beams 16 16 on either side of the keelson. In the form shown in Fig. 3, the parallel beams at the side of the keelson are notched so that the light transverse frames can be carried past them. At greater intervals than the light transverse frames are the transverse frames 17 17 which are as deep as the longitudinal compartments, and are preferably a continuation of the transverse partitions of the compartments. Similar deep transverse frames connect the upper longitudinal compartments.

Where a wall is defined as continuous it is to be understood that it is continuous in the sense that mechanical strains are transmitted continuously while it may be made up of many plates of such length and width as are obtainable, and it may be intersected by other walls, frames or partitions to which it is joined in such firm manner that the mechanical strains are transmitted therethrough.

What I claim as new, and desire to secure by Letters Patent of the United States, is—

1. A tank vessel containing vertical walled tanks provided on each side with an upper longitudinal compartment and a lower longitudinal compartment the longitudinal walls of which are continuous throughout the length of the body portion of the vessel, and connecting means between the compartments consisting of the side skin of the vessel and the portions of the tank side walls which lie between the compartments whereby the compartments are made to constitute upper and lower members of a girder for the longitudinal stiffening of the vessel, substantially as described.

2. A tank vessel containing vertical cylindrical walled tanks provided on each side with an upper longitudinal compartment and a lower longitudinal compartment the longitudinal walls of which are continuous throughout the length of the body portion of the vessel, and connecting means between the compartments consisting of the side skin of the vessel and the portions of the tank side walls which lie between the compartments whereby the compartments are made to constitute upper and lower members of a girder for the longitudinal stiffering of the vessel, substantially as described.

Signed at New York, N. Y., this 22nd day of January, 1915.

CHARLES P. M. JACK.

Witnesses:
SAMUEL W. BALCH,
MAX WILLEMSTYN.

Copies of this patent may be obtained for five cents each, by addressing the "Commissioner of Patents, Washington, D. C."